United States Patent [19]
Gilbert et al.

[11] Patent Number: 5,915,411
[45] Date of Patent: Jun. 29, 1999

[54] RECREATIONAL VEHICLE DUMPSTER HOSE ASSEMBLY

[75] Inventors: Charles C. Gilbert; Howard J. Humphries, both of Colorado Springs, Colo.

[73] Assignee: Level Upp, Inc., Colorado Springs, Colo.

[21] Appl. No.: 08/756,700

[22] Filed: Nov. 26, 1996

Related U.S. Application Data

[63] Continuation of application No. 08/495,916, Jun. 28, 1995.
[51] Int. Cl.$^6$ ....................................................... F16L 3/00
[52] U.S. Cl. ...................... 137/355.28; 137/899; 251/368
[58] Field of Search ............................... 137/355.28, 899; 251/368

[56] References Cited

U.S. PATENT DOCUMENTS

| | | | |
|---|---|---|---|
| 3,381,705 | 5/1968 | Murphy | 137/355.28 |
| 4,650,224 | 3/1987 | Smith | 137/899 |
| 5,247,974 | 9/1993 | Sargent et al. | 137/899 |
| 5,607,107 | 3/1997 | Grieve et al. | 137/355.23 |

*Primary Examiner*—A. Michael Chambers
*Attorney, Agent, or Firm*—Phillip A. Rein

[57] ABSTRACT

A dumpster hose assembly operable to be mounted between a waste discharge pipe member on a recreational vehicle to a receiver member on a dumpster tank reservoir to remove waste waste products from a reservoir tank in the recreational vehicle. The recreational vehicle dumpster hose assembly includes 1) a female entrance and coupling member readily and releasably attachable to a male coupling member on the waste discharge pipe member on the recreational vehicle; and 2) a flexible hose member having one end connected to the female entrance end coupling member and an opposite end connected to a male discharge end coupling member. The male discharge end coupling member is readily connected to a female coupling member which, in turn, is connected to a swivel coupling member. The swivel coupling member is connected by a primary sleeve member to an entrance leg section on the receiver member for dumping waste products into the dumpster tank reservoir. The swivel coupling member includes a female coupling member rotatably connected to the primary sleeve member. The flexible hose member is constructed of a thin Polyurethane material which withstands abusive treatment; is lightweight in construction; and readily opens on receiving fluid pressure therein from a folded to a fully circular shape for a maximum discharge rate therefrom.

6 Claims, 2 Drawing Sheets

RECREATIONAL VEHICLE DUMPSTER HOSE ASSEMBLY

PRIOR ART

A patent search was not conducted on this invention. This application is a continuation of Ser. No. 08/495,916, filed Jun. 28, 1995.

PREFERRED EMBODIMENT OF THE INVENTION

In one preferred embodiment of this invention, a recreational vehicle dumpster hose assembly is utilized with a recreational vehicle in order to receive and convey waste materials therefrom for discharge into a dumpster tank member or reservoir.

The recreational vehicle is provided with a waste discharge pipe member having mounted thereon a discharge control valve member and a lock male coupling member. The discharge control valve member is selectively operable to be moved from a closed to an opened condition to discharge waste products through the lock male coupling member and into the recreational vehicle dumpster hose assembly and finally into the dumpster tank reservoir.

The lock male coupling member is provided with a main flange body having diametrically opposed lock post members and a pipe connector section. The pipe connector section is inserted within and sealed with an outer end of the waste discharge pipe member.

The dumpster tank reservoir is provided with a main receiver elbow member being of 90 degrees having a discharge leg section inserted within the discharge tank reservoir and an entrance leg section is connected to a swivel coupling member.

The swivel coupling member includes a primary sleeve member having one inner portion secured to an outer end portion of the entrance leg section and having a female coupling member rotatably connected to an outer portion of the primary sleeve member.

The primary sleeve member is provided with an inner swivel groove section for reasons to be noted.

The female coupling member includes a connector ring section integral with diametrically opposed L-shaped hook sections. Each L-shaped hook section includes an anchor slot for receiving a respective lock post member from a lock male coupling member on the recreational vehicle dumpster hose assembly as will be explained.

Further, the female coupling member is provided with a swivel connector section having an outer swivel projection mounted within the swivel groove section to permit relative rotational movement therebetween. The female coupling member includes an O-ring member for sealing purposes with one end of the recreational vehicle dumpster hose assembly.

The recreational vehicle dumpster hose assembly includes 1) a first or female entrance end coupling member; 2) a flexible hose member having one end connected to the female entrance end coupling member; 3) a second or male discharge end coupling member connected to an opposite end of the flexible hose member; and 4) a conveyance and storage member operable to receive and store the recreational vehicle dumpster hose assembly therein.

The female entrance end coupling member is provided with a connector ring section having diametrically opposed movement lug projections and integral with a female coupling member a hose connector section.

The female coupling member has L-shaped hook sections to be selectively engagable in a locking relationship with the lock post members on the lock male coupling member on the recreational vehicle in the connected usage condition. An O-ring member is mounted between the female coupling member and the lock male coupling member to prevent fluid leakage therebetween.

The hose connector section is provided with an outer surface to which is applied an adhesive layer and operable to receive thereabout one end portion of the flexible hose member being secured thereto.

The flexible hose member is provided with 1) a first or vehicle connector end section connected to the hose connector section of the female entrance end coupling member; 2) the vehicle connector end section is integral with a mid-body section which, in turn, is integral with a second or dumpster connector end section; 3) the vehicle connector end, section is secured as by the adhesive layer to the hose connector section of the female entrance end coupling member; and 4) the dumpster connector end section is provided with an adhesive layer for anchoring to an outer surface of the male discharge end coupling member.

The flexible hose member is constructed of a special plastic material known as "Texin" which is a Polyurethane Polyether Elastomer having numerous characteristics desirable in this application including being 1) readily foldable over itself; 2) workable in cold weather; and 3) provided with a smooth, slick inner surface so that the discharged waste products would flow freely therethrough and have little resistance to product movement therein.

The second or male discharge end coupling member is provided with 1) a main flange body having a pair of diametrically opposed, laterally extended lock post members; and 2) a hose receiver section to receive the dumpster connector end section of the flexible hose member thereon and anchored thereto by an adhesive layer.

The male discharge end coupling member is operable to be releasably connected to the female coupling member on the swivel coupling member in a locked relationship. The lock post members are mounted within the L-shaped hook sections and having an ring member mounted therebetween to achieve a fluid seal at the receiver elbow member on the dumpster tank reservoir.

The recreational vehicle dumpster hose assembly of this invention is provided with easy to attach and disassemble end coupling members between the waste discharge pipe member on a recreational vehicle for dumping waste material into a dumpster tank reservoir through a swivel coupling member.

The recreational vehicle dumpster hose assembly is readily cleaned out by flushing clean water therethrough in a minimum amount of time and effort and leaves an interior in a clean condition.

The flexible hose member is operable to be readily folded over itself similar to a hanging fire hose in a building and can be placed through an entrance opening into the conveyance and storage member to achieve a neat and compact storage condition.

The prior art dumpster hose assemblies utilize a large hose having a coiled inner support wire which is difficult to clean and requires a large storage area after usage.

OBJECTS OF THE INVENTION

One object of this invention is to provide a recreational vehicle dumpster hose assembly which is provided with a first entrance end coupling member to be easily attached to a waste discharge pipe member on a recreational vehicle and having another end readily connected through a second discharge end coupling member to a swivel coupling member on a receiver member on a dumpster tank reservoir for discharge of the waste products therethrough.

Another object of this invention is to provide a recreational vehicle dumpster hose assembly having a flexible hose member with outer end coupling members and the flexible hose member is constructed of a thin unique plastic material which 1) remains substantially flexible regardless of cold weather conditions; 2) is easily foldable over itself into a compact condition; 3) is readily flushed out with a minimum amount of clear water after usage; and 4) after being folded, can be carried and stored in a compact manner in a conveyance and storage member.

One other object of this invention is to provide a recreational vehicle dumpster hose assembly having a flexible hose member constructed of a unique plastic material known as "Texin" which is a Polyurethane Polyether Elastomer providing a durable, long-lasting flexible hose member which is easy to use.

A further object of this invention is to provide a recreational vehicle dumpster hose assembly which is readily conveyed in a compact manner in a conveyance and storage member; easily unfolded and readily attached between a waste discharge pipe member or a recreational vehicle and a receiver member on a dumpster tank reservoir for readily and efficiently removing waste products from a recreational vehicle waste storage tank.

Still, one other object of this invention is to provide a recreational vehicle dumpster hose assembly which is readily removed from the conveyance and storage member for ease of usage with a minimum amount of time and effort; economical to manufacture; readily usable and flexible in all weather conditions; of a lightweight and durable construction; provided with a swivel coupling member and first and second end coupling members which are readily usable with a minimum amount of effort and presents fluid sealed coupling; and substantially maintenance free.

Various other objects, advantages, and features of the invention will become apparent to those skilled in the art from the following discussion, taken in conjunction with the accompanying drawings, in which:

FIGURES OF THE INVENTION

Figure 1:
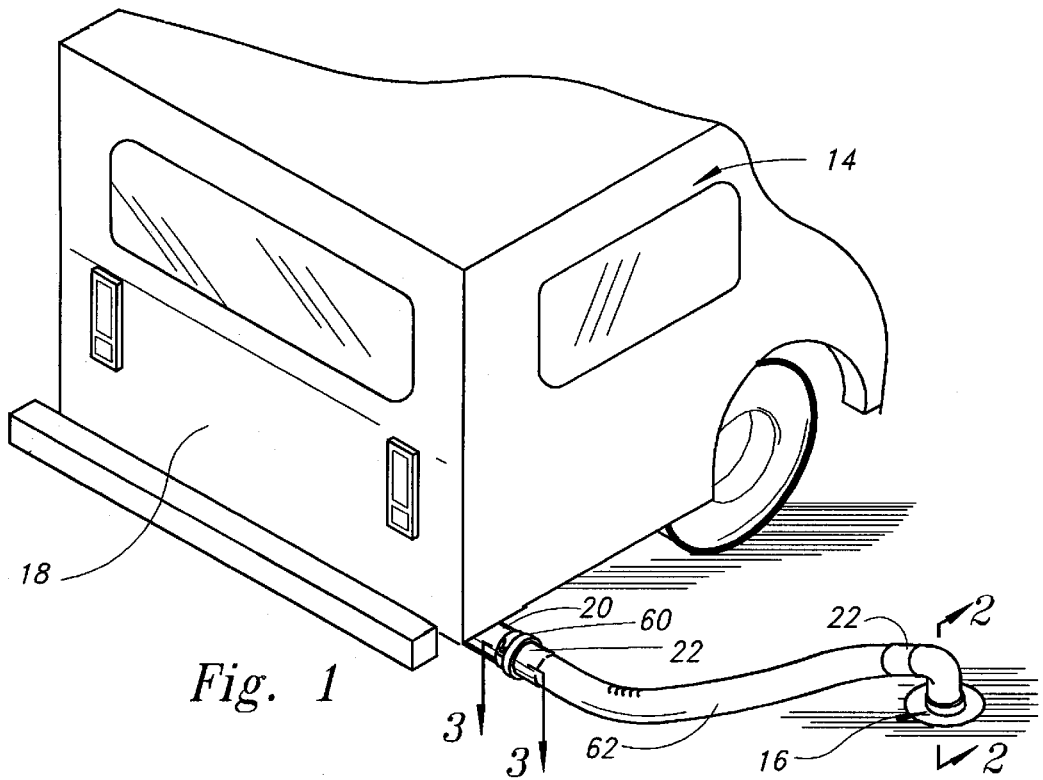
FIG. 1 is a fragmentary perspective view of an end section of a recreational vehicle having a dumpster hose assembly of this invention connected between the recreational vehicle and a dumpster tank reservoir for transferring waste products therebetween.

The following is a discussion and description of preferred specific embodiments of the recreational vehicle dumpster hose assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail and, in particular to FIG. 1, a recreational vehicle dumpster hose assembly of this invention, indicated generally at 12, is illustrated as having one end releasably connected to a portion of a recreational vehicle 14 and an opposite end releasably connected to a dumpster tank reservoir 16 operable to transfer waste products therebetween.

As noted in FIG. 1, the recreational vehicle 14 includes a rear end section 18 having a waste discharge pipe member 20. A lock male coupling member 22 is connected to an outer end of the waste discharge pipe member 20.

A discharge control valve member (not shown) is connected to the waste discharge pipe member 20 and operable to be opened to selectively allow movement of waste products and dispensing through the waste discharge pipe member 20.

Figure 3:
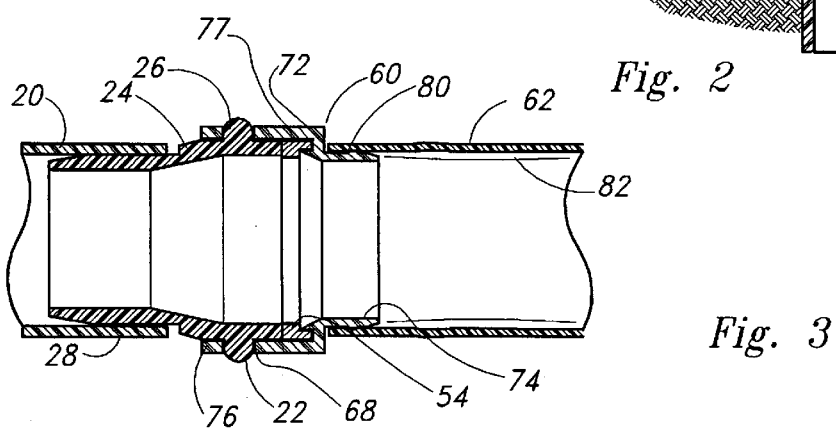
FIG. 3 is an enlarged fragmentary sectional view taken along line 3—3 in FIG. 1.

More particularly, as shown in FIG. 3, the male coupling member 22 is provided with a main flange body 24 which is permanently connected to the outer end of the waste discharge pipe member 20 and having laterally extended lock post members 26.

The lock post members 26 are diametrically opposed and operable to lock and engage a female coupling member on one end of the recreational vehicle dumpster hose assembly 12 as will be described.

The dumpster tank reservoir 16 is provided with a receiver elbow member or receiver means 30, preferably of 90 degrees, and having a swivel coupling member 32 connected to the receiver elbow member 30.

More specifically, the receiver elbow member 30 is provided with a discharge leg section 36 extended downwardly into an opening in the dumpster tank reservoir 16 and an entrance leg section 34 connected to the swivel coupling member 32 which, in turn, is releasably connected to one end of the recreational vehicle dumpster hose assembly 12.

Figure 2:
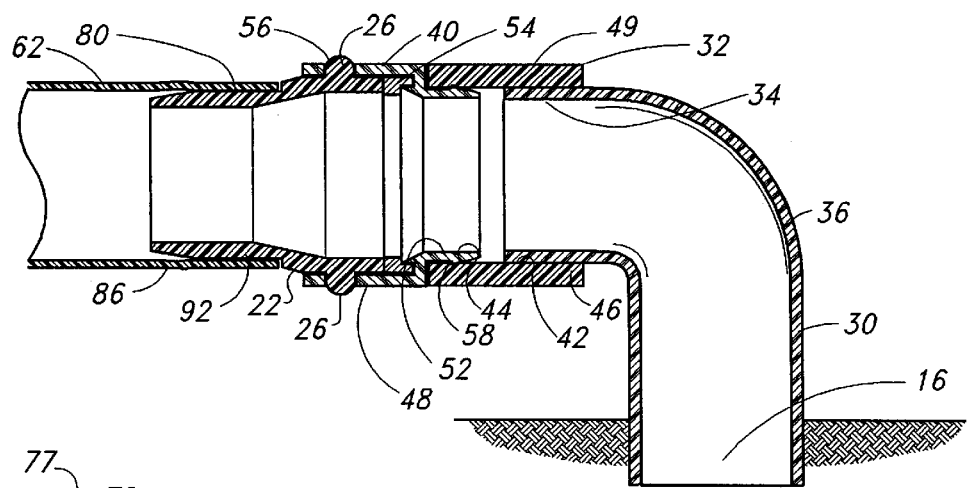
FIG. 2 is an enlarged fragmentary sectional view taken along line 2—2 in FIG. 1.

As shown in FIG. 2, the swivel coupling member 32 includes an outer primary sleeve member 38 having a female coupling member 40 rotatably connected thereto. The primary sleeve member 38 is provided with an inner wall section 42 having a swivel groove section 44 and an outer elbow connector section 46 which is operable to be secured to the entrance leg section 34 of the receiver elbow member 30.

The female coupling member 40 is provided with a connector ring section 48 integral with diametrically opposed L-shaped hook sections 50 and a swivel connector section 52 operable to be inserted within an outer end of the primary sleeve member 38.

Each L-shaped hook section 50 is provided with an anchor slot 56 adapted to receive and enclose a respective lock post member 26 on a lock male coupling member 22 as will be described.

Figure 4:
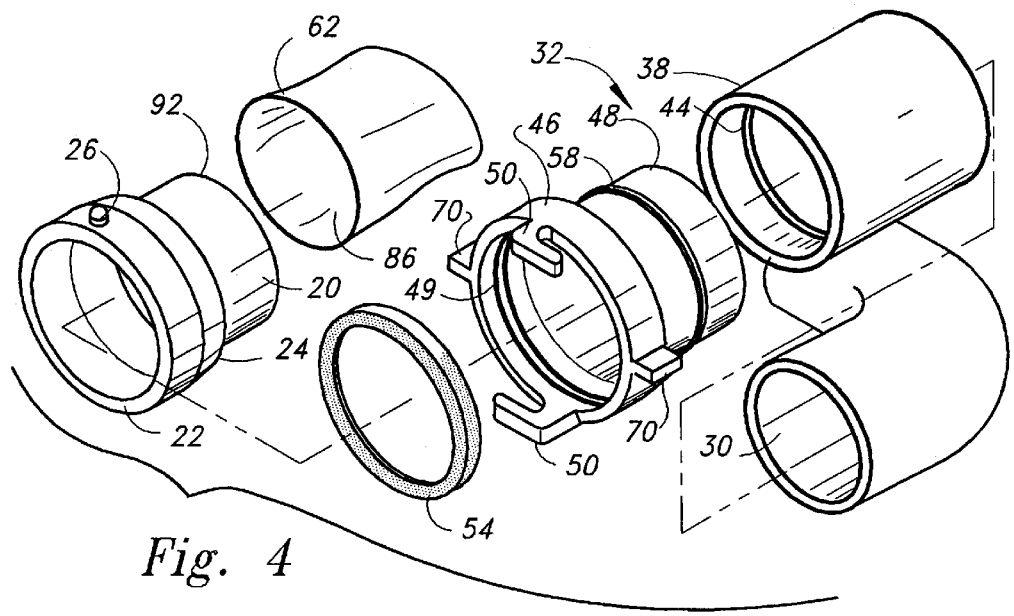
FIG. 4 is an exploded perspective view of a dumpster tank reservoir, receiver elbow member, a swivel coupling member, and a lock male coupling member to be connected to one end of a flexible hose member.

As best noted in FIG. 4, the swivel connector section 52 is provided with a peripheral swivel projection 58 operable to be placed within the swivel groove section 44 in the primary sleeve member 38 when assembled as shown in FIG. 2. This allows the female coupling member 40 to rotate about the primary sleeve member 38.

The connector ring section 48 is provided with a seal receiver slot 49 operable to receive and support an O-ring member 54 therein. The O-ring member 54 is operable on coupling with the male coupling member 22 to provide a seal to prevent leakage of fluids therefrom during a waste product disposing operation.

Figure 5:
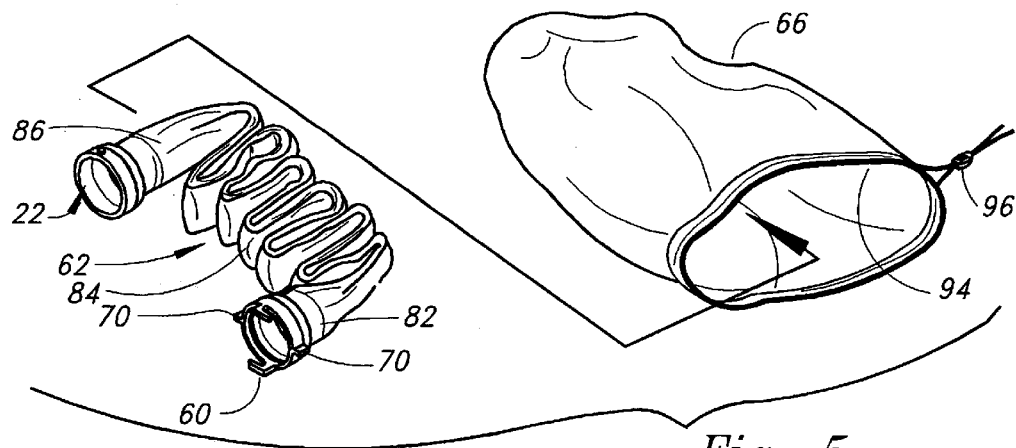
FIG. 5 is a perspective view illustrating how the recreational vehicle dumpster hose assembly is operable to be collapsed, folded, and placed within a conveyance and storage member.

The recreational vehicle dumpster hose assembly 12 can be constructed of selected desired lengths and includes 1) a first or female entrance end coupling member 60; 2) a flexible hose member 62 having one end connected to the female entrance end coupling member 60; 3) a second or male discharge end coupling member 22 connected to another end of the flexible hose member 62; and 4) a conveyance and storage member 66, as noted in FIG. 5, adapted to receive, support, and store a collapsed and folded one of the recreational vehicle dumpster hose assembly 12.

The female entrance end coupling member 60 includes 1) a connector ring section 68 having movement lug projections 70 diametrically opposed from each other for ease of rotational movement during a connecting operation and a seal receiver slot 77; 2) a female coupling member 72 directly opposed to each other; 3) a hose connector section 74 connected to one end of the flexible hose member 62; and 4) the female coupling member 72 is provided with a pair of opposed L-shaped hook sections 76 which are operable for engaging the lock post members 26 on the lock male coupling member 22 which is attached to the recreational vehicle 14 (FIG. 3).

As shown in FIG. 3, one end of the flexible hose member 62 is mounted about and over the hose connector section 74 and secured thereto by an adhesive layer 80.

As noted in FIG. 3, an O-ring member 54 is mounted within the seal receiver slot 77 in the connector ring section 68 and engagable with an outer end portion of the lock male coupling member 22 being an inner surface of the main flange body 24 when in an assembled condition to provide a fluid seal condition.

The flexible hose member 62 is provided with a first or vehicle connector end section 82 integral at an inner end with a mid-body section 84 which, in turn, is integral at an outer end with a second or dumpster connector end section 86.

The second or male discharge end coupling member 22 is previously described as utilized on the waste discharge pipe member 20 of the recreational vehicle 14. The male discharge end coupling member 22 includes a main flange body 24 having laterally extended, diametrically opposed lock post members 26 engagable with the L-shaped hook sections 50 on the female coupling member 40 on the dumpster tank reservoir 16 (FIG. 2).

The male discharge end coupling member 22 includes an outer hose receiver section 92 to receive the dumpster connector end section 86 of the flexible hose member 62 therabout and secured thereto by an adhesive layer 80.

The flexible hose member 62 is operable to be folded inwardly as noted in FIG. 5 and readily placed within the conveyance and storage member 66 for ease of storing conveyance in the recreational vehicle 14.

More particularly, the collapsed flexible hose member 62 can be readily placed though an entrance opening 94 and held in the conveyance and storage member 66 by use of a closure draw string 96 in a conventional manner.

Figures 6A, 6B, 6C:
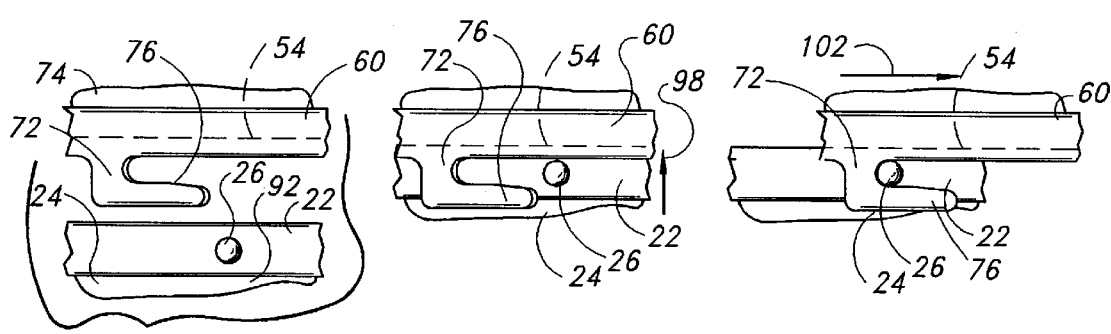
FIGS. 6a, 6b, and 6c are schematic diagrams illustrating steps used to interconnect a lock male coupling member to a female coupling member.

Referring to the diagrams to FIGS. 6a, 6b, and 6c, this discloses how a female coupling member 72 is placed adjacent and diametrically opposite a lock male coupling member 22 prior to achieving a coupling and sealing operation.

As noted in FIG. 6b, the lock male coupling member 22 can be moved upwardly as shown by the arrow 98. In this position, an O-ring member 54 is being compressed between adjacent abutting surfaces of the male coupling member 22 and the female coupling member 72.

As noted in FIG. 6c, the female coupling member 72 is rotated as shown by an arrow 102 and the lock post members 26 are held and locked in respective diametrically opposed L-shaped hook sections 76.

The applicants herein have conducted numerous tests on the Polyurethane Polyether Elastomer material used to produce the flexible hose member 62. It has been found that by making the flexible hose member 62 of a relatively small thickness, the flexible hose member 62 is able to be readily folded back and forth over itself as noted in FIG. 5 due to its thinness and flexibility.

The flexible hose member 62 has been tested under conditions of minus 20 degrees below zero. The flexible hose member 62 has been filled with water, frozen, and dragged across various rough surfaces. The dragging across rough surfaces causes little, if any, damage thereto and the flexible hose member 62, being thin, remains flexible at low temperatures so that it can be used, cleansed, folded, and placed with the conveyance and storage member 66.

Further, testing has been accomplished to obtain this new and novel recreational vehicle dumpster hose assembly 12 which is much superior over the prior art structures. The prior art structures normally consist of rigid hose members having wire mounted on the inside thereof to hold in the open condition during usage. It is found that a recreational vehicle owner may need to replace this prior art dumpster hose two or three times a year. The prior art use is very difficult to clean after usage due to the coiled wire therein and takes considerable storage space as will not fold up like the applicants' recreational vehicle dumpster hose assembly 12 as noted in FIG. 5.

USE AND OPERATION OF THE INVENTION

In the use and operation of this invention; it is obvious that a stored recreational vehicle dumpster hose assembly 12 can be removed from the conveyance and storage member 66 as shown in FIG. 5.

First, the user would take the female entrance end coupling member 60 which is secured to one end of the flexible hose member 62 and place the female coupling member 72 in an adjacent position to the lock male coupling member 22 on the waste discharge pipe member 20 of the recreational vehicle 14.

Following the steps of FIGS. 6a, 6b, and 6c, the lock male coupling member 22 would be moved inwardly and rotated to place the lock post members 26 of the lock male coupling member 22 within the L-shaped hook sections 76 of the female entrance end coupling member 60 as noted by the arrow 102 in FIG. 6c. Concurrently, this would cause a compression of the O-ring member 54 to achieve a water-tight seal betwen the lock male coupling member 22 and the female coupling member 72.

Next, the recreational vehicle operator would take the opposite end of the flexible hose member 62 with the male discharge end coupling member 22 connected thereto which would be placed in an axially aligned adjacent position to the female coupling member 40 on the swivel coupling member 32. The swivel coupling member 32 is connected to the receiver elbow member 30 having a discharge leg section 36 mounted within a top opening into the dumpster tank reservoir 16.

At this time, the female coupling member 40 is rotated as shown by the arrow 102 in FIG. 6c to achieve a compression of an O-ring member 54 to provide a fluid sealed condition therebetween.

Next, the recreational vehicle or dumpster operator would proceed to open the discharge control valve member on the waste discharge pipe member 20 which would then cause the waste products stored in a reservoir tank on the recreational vehicle 14 to quickly force open the entire length of the flexible hose member 62. This is readily achieved due to the lightweight nature of the flexible hose member 62 constructed of the new and novel Polyurethane Polyether Elastomer material.

It is noted that only a slight amount of clean fluid is necessary after dumping the waste products from the recreational vehicle 14 to cause a complete cleansing of all waste products from the flexible hose member 62.

After usage, it is obvious that the recreational vehicle or dumpster operator would then close the discharge control valve member to prevent any further discharge of materials from the reservoir tank within the recreational vehicle 14.

At this time, the female entrance end coupling member 60 and the male discharge end coupling member 22 can be removed from their connections to respective ones of the lock male coupling member 22 and the female coupling member 40.

Then, the recreational vehicle dumpster hose assembly 12 can be folded inwardly to the condition as noted in FIG. 5 and readily placed through the entrance opening 94 into the conveyance and storage member 66. The entrance opening 94 would then be closed in a conventional manner by the closure draw string 96 and readily stored within a hidden compartment in the recreational vehicle 14 until required for the next usage.

It is noted that the recreational vehicle dumpster hose assembly has many advantages over the prior art dumpster hose structures in that 1) it is very flexible and automatically opens on receiving the waste product flow therethrough; 2) it has an extremely slick inner surface to not add friction to the flow of waste products therethrough; 3) is very strong in composition and not readily damaged on placing over rough surfaces such as gravel or concrete; 4) is easy to fold up into a flat condition for storage and conveyance; 5) economical to manufacture; and 6) substantially maintenance free.

The applicants' Polyurethane recreational vehicle dumpster hose assembly 12 has been subjected to product evaluation testing at the LEVEL UPP, INC. testing facility in Colorado Springs, Colo. The following tests were conducted and the term "hose(s)" refers to the applicants' Polyurethane flexible hose member 62.

| | |
|---|---|
| Test #1 | A freeze test to determine if this hose would remain flexible during sub zero working conditions and without breaks from expansion or bending.<br>Reason for test is because recreational vehicles operate in areas and under conditions where freezing occurs day and night. |
| | Test:<br>Five (5) hoses were filled with water frozen at −20 degrees Fahrenheit with closed ends to check expansion breakage with fluids inside. No breaks or splits occurred. The hoses were pounded up and down on a concrete driveway with the ice inside to see if the sharp edges on the broken ice would cut the hose. The ice was melted out and the hoses filled with water in a pressure test and no breaks had occurred. |
| Test #2 | Effects of ultraviolet and heat decomposition during hot weather conditions.<br>Test:<br>This test hose was connected to a dump station and left there for a 6 month period in Eugene, Oregon. The hose was used to dump recreational vehicles holding tanks 6 to 7 times per week and remained laying on the ground in the sun when not in use. The hose, after this 6 month test period, showed no sign of material or color decomposition. |
| Test #3 | Effects of abusive hose use.<br>Test:<br>This hose was laid on crushed rock on a concrete driveway and then was driven on, back and forth, 60 times by a 22 ton motor home. The hose was examined and found to have no pinch holes or other breaks from the tires or the-crushed rocks. |

While the invention has been described in conjunction with preferred specific embodiments thereof, it will be understood that this description is intended to illustrate and not to limit the scope of the invention, which is defined by the following claims:

We claim:

1. A dumpster hose assembly adapted to be mounted between a waste discharge pipe member on a recreational vehicle and a receiver member on a dumpster tank reservoir, comprising:

a) a first entrance end coupling member connected to a discharge member on a recreational vehicle;

b) a second discharge end coupling member connected to a reservoir member on a dumpster tank reservoir;

c) a flexible hose member having one end connected to said first entrance end coupling member and an opposite end connected to said second discharge end coupling member;

d) said reservoir member includes a coupling member sealingly and releasably connected to said second discharge end coupling member; and e) said coupling member includes a swivel connector section to permit rotation of said second discharge end coupling member to provide a mechanical, non-leaking seal therebetween.

2. A dumpster hose assembly as described in claim 1, wherein:

a) said coupling member includes a primary sleeve member connected to a female coupling member with said swivel connector section therebetween.

3. A dumpster hose assembly as described in claim 2, wherein:

a) said swivel connector section includes a swivel groove in said primary sleeve member engageable with a swivel projection on said female coupling member to form the mechanical seal therebetween.

4. A dumpster hose assembly as described in claim 3, wherein:
   a) said swivel projection forming a seal on both sides thereof with inclined sides on said swivel groove to prevent fluid leakage thereabout being the mechanical seal.

5. A dumpster hose assembly as described in claim 1, wherein:
   a) said flexible hose member foldable back over itself similar to a fire hose having a thickness on each layer approximately equal to double a wall thickness of said flexible hose member.

6. A dumpster hose assembly as described in claim 1, wherein:
   a) said flexible hose member constructed of a thin walled, flexible polyurethane polyether elastomer material being readily foldable under extreme cold weather conditions.

* * * * *